US008334891B2

(12) United States Patent
Graham et al.

(10) Patent No.: US 8,334,891 B2
(45) Date of Patent: Dec. 18, 2012

(54) MULTIPOINT CONFERENCE VIDEO SWITCHING

(75) Inventors: Philip R. Graham, Milpitas, CA (US); Hugh J. McLaughlin, Mountain View, CA (US); David J. Mackie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1207 days.

(21) Appl. No.: 12/023,824

(22) Filed: Jan. 31, 2008

(65) Prior Publication Data

US 2008/0218586 A1 Sep. 11, 2008

Related U.S. Application Data

(60) Provisional application No. 60/892,964, filed on Mar. 5, 2007.

(51) Int. Cl.
*H04N 7/14* (2006.01)

(52) U.S. Cl. .................................. 348/14.09; 348/14.08

(58) Field of Classification Search .... 348/14.01–14.16; 379/201.01, 202.01
See application file for complete search history.

(56) References Cited

U.S. PATENT DOCUMENTS

| 5,007,046 A | 4/1991 | Erving et al. ................. 370/32.1 |
| 5,058,153 A | 10/1991 | Carew et al. .................. 379/390 |
| 5,436,896 A | 7/1995 | Anderson et al. ............... 370/62 |
| 5,473,363 A | 12/1995 | Ng et al. |
| 5,481,720 A | 1/1996 | Loucks et al. ................... 726/21 |
| 5,560,008 A | 9/1996 | Johnson et al. ................... 726/5 |
| 5,764,887 A | 6/1998 | Kells et al. ....................... 726/14 |
| 5,768,379 A | 6/1998 | Girault et al. .................. 713/185 |
| 5,787,170 A | 7/1998 | Op de Beek .................. 713/165 |
| 5,815,574 A | 9/1998 | Fortinsky ....................... 713/153 |
| 5,822,433 A | 10/1998 | Bottle et al. ................... 713/155 |
| 5,844,600 A | 12/1998 | Kerr ................................ 348/17 |
| 5,848,098 A | 12/1998 | Cheng et al. .................. 375/220 |
| 5,854,894 A | 12/1998 | Lancaster et al. ............. 709/219 |
| 5,864,665 A | 1/1999 | Tran ................................ 726/10 |

(Continued)

FOREIGN PATENT DOCUMENTS

EP 1 720 283 A2 1/2004

(Continued)

OTHER PUBLICATIONS

The Third Office Action from the Patent Office of the People's Republic of China in Chinese Application No. 200480026120.3 (with translation), dated May 6, 2011, 8 pages.

(Continued)

*Primary Examiner* — Brian Ensey
(74) *Attorney, Agent, or Firm* — Baker Botts L.L.P.

(57) ABSTRACT

A method includes receiving a plurality of audio signals, wherein the audio signals each include a plurality of packets containing voice data associated with conference participants. One or more of the audio signals is associated with a video signal and at least one of the audio signals is associated with a voice-only conference participant. The method further includes determining an activity metric for each of the plurality of audio signals, wherein the activity metric indicates a confidence value that the audio signal is associated with a conference participant that is currently speaking. The method also includes encoding, for each of the plurality of audio signals, one or more packets of the plurality of packets with the activity metric and sending the plurality of audio signals encoded with an activity metric to a conference bridge.

25 Claims, 3 Drawing Sheets

U.S. PATENT DOCUMENTS

| | | | | |
|---|---|---|---|---|
| 5,920,562 | A | 7/1999 | Christie et al. | 370/395.5 |
| 5,928,323 | A | 7/1999 | Gosling et al. | 709/203 |
| 5,974,566 | A | 10/1999 | Ault et al. | 714/15 |
| 5,983,273 | A | 11/1999 | White et al. | 709/229 |
| 6,078,809 | A | 6/2000 | Proctor | 455/416 |
| 6,088,430 | A | 7/2000 | Mc Hale | 379/93.38 |
| 6,122,631 | A | 9/2000 | Berbec et al. | 707/9 |
| 6,128,649 | A | 10/2000 | Smith et al. | 709/217 |
| 6,148,068 | A | 11/2000 | Lowery et al. | 379/202 |
| 6,300,973 | B1 | 10/2001 | Feder et al. | 348/14.09 |
| 6,327,276 | B1 | 12/2001 | Robert et al. | 370/535 |
| 6,332,153 | B1 | 12/2001 | Cohen | 709/204 |
| 6,393,481 | B1 | 5/2002 | Deo et al. | 709/224 |
| 6,401,211 | B1 | 6/2002 | Brezak, Jr. et al. | 726/5 |
| 6,418,125 | B1 | 7/2002 | Oran | |
| 6,453,362 | B1 | 9/2002 | Bittinger et al. | 719/316 |
| 6,477,708 | B1 | 11/2002 | Sawa | 725/116 |
| 6,501,739 | B1 | 12/2002 | Cohen | |
| 6,535,604 | B1 | 3/2003 | Provencal et al. | 379/388.06 |
| 6,567,916 | B1 | 5/2003 | Terao et al. | 713/176 |
| 6,590,604 | B1 | 7/2003 | Tucker et al. | 348/14.13 |
| 6,662,211 | B1 | 12/2003 | Weller | |
| 6,678,733 | B1 | 1/2004 | Brown et al. | 709/229 |
| 6,697,342 | B1 | 2/2004 | Smyth et al. | |
| 6,760,759 | B1 | 7/2004 | Chan | 709/219 |
| 6,819,652 | B1 | 11/2004 | Akhtar et al. | 370/230 |
| 6,981,047 | B2 | 12/2005 | Hanson et al. | 709/227 |
| 6,986,157 | B1 | 1/2006 | Fijolek et al. | 725/111 |
| 6,989,856 | B2 * | 1/2006 | Firestone et al. | 348/14.09 |
| 7,006,616 | B1 | 2/2006 | Christofferson et al. | |
| 7,007,098 | B1 | 2/2006 | Smyth et al. | |
| 7,039,027 | B2 | 5/2006 | Bridgelall | 370/329 |
| 7,054,268 | B1 | 5/2006 | Paranteinen et al. | 370/231 |
| 7,079,499 | B1 | 7/2006 | Akhtar et al. | 370/310 |
| 7,145,898 | B1 | 12/2006 | Elliott | 370/352 |
| 7,151,758 | B2 | 12/2006 | Kumaki et al. | 370/331 |
| 7,266,091 | B2 | 9/2007 | Singh et al. | 370/260 |
| 7,454,460 | B2 | 11/2008 | Ivashin | |
| 7,477,282 | B2 | 1/2009 | Firestone et al. | 348/14.09 |
| 7,848,265 | B2 | 12/2010 | Levy et al. | |
| 2002/0044534 | A1 | 4/2002 | Cohen | |
| 2002/0126626 | A1 | 9/2002 | Singh et al. | |
| 2003/0174657 | A1 | 9/2003 | Qin | |
| 2004/0008635 | A1 | 1/2004 | Nelson | 370/260 |
| 2005/0078170 | A1 | 4/2005 | Firestone et al. | 348/14.08 |
| 2005/0099492 | A1 * | 5/2005 | Orr | 348/14.08 |
| 2005/0237377 | A1 | 10/2005 | Chapweske et al. | |
| 2006/0106703 | A1 | 5/2006 | Del Rey et al. | 705/35 |
| 2006/0221869 | A1 | 10/2006 | Chua | |
| 2006/0251038 | A1 | 11/2006 | Tamura et al. | 370/342 |
| 2006/0264207 | A1 | 11/2006 | Tamura et al. | 455/415 |
| 2007/0078933 | A1 | 4/2007 | Ludwig et al. | |
| 2008/0159507 | A1 | 7/2008 | Virolainen et al. | |
| 2008/0266384 | A1 | 10/2008 | Triplicane et al. | 348/14.09 |

FOREIGN PATENT DOCUMENTS

| | | |
|---|---|---|
| JP | 2004538724 (T) | 8/1995 |
| WO | WO 03/065720 | 8/2003 |

OTHER PUBLICATIONS

The First Office Action from the State Intellectual Property Office of the People's Republic of China in Chinese Application No. 200880014096.X (with translation), dated May 25, 2011 (received Jun. 28, 2011), 6 pages.

European Patent Office Official Action in Application No. 04 794 355.0-1241 dated Aug. 16, 2011, 2 pages.

The Second Office Action, The Patent Office of the People's Republic of China, Application No. 200480026120.3, 7 pages (only first 2 pages translated), Dec. 11, 2009.

Vijayaraghavan R. Triplicane, et al., "Media Detection and Packet Distribution in a Mulitpoint", U.S. Appl. No. 11/799,019, filed Apr. 30, 2007.

USPTO Office Action for U.S. Appl. No. 11/799,019 (13 pages), Jan. 4, 2012.

EPO Communication dated Feb. 10, 2012, with regard to Application PCT US2004032977.

PCT; International Search Report and Written Opinion; (IS/US) for PCT/US2008/55405 (8 pages), Jun. 5, 2008.

PCT Notification of Transmittal of the International Search Report regarding PCT US 2008/061711, mailed Oct. 10, 2008.

Australian Government letter to Pizzeys, Examiner's First Report on Patent Application No. 2004306740, Mar. 25, 2009.

Woo et al., Authentication for Distributed Systems, 1992, IEEE, pp. 39-51, Jan. 1992.

Neuman et al., Kerberos: An Authentication Service for Computer Network, Sep. 1994, IEEE, pp. 33-38.

Anonymous, Kerberos: A model for Single Sign-On, Mar. 2004, Business Communications Review, p. 43.

Fontana, Web Services Security Spec Approved, Apr. 26, 2004, Network World, p. 22.

Firestone, U.S. Appl. No. 10/680,918, filed Oct. 8, 2003, Communication from the Patent Office mailed Dec. 3, 2004.

Firestone, U.S. Appl. No. 10/680,918, filed Oct. 8, 2003, Communication from the Patent Office mailed Apr. 26, 2005.

Firestone, U.S. Appl. No. 10/680,918, filed Oct. 8, 2003, Communication from the Patent Office mailed Feb. 16, 2006.

Firestone, U.S. Appl. No. 10/680,918, filed Oct. 8, 2003, Communication from the Patent Office mailed Jun. 7, 2006.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

Iyer, et al., "Method and System for Selective Buffering", U.S. Appl. No. 11/465,239, filed Aug. 17, 2006.

State Intellectual Property Office of the People's Republic of China First Office Action for Application No. 200880007368.3; 12 pages, Sep. 26, 2011.

The Second Office Action issued by the Patent Office of The People's Republic of China; Application No. 200880014096.X; Serial No. 2012060100777440, Jun. 6, 2012.

EPO Communication Pursuant to Article 94(3) EPC; Application No. 04 794 355.0-1241; Ref: P28668EP-PCT/IK, Apr. 17, 2012.

The Patent Office of the People's Republic of China, The Second Office Action dated Jul. 20, 2012 with regard to Application No. 200880007368.3, Serial 2012071700994540.

* cited by examiner

MULTIPOINT CONFERENCE VIDEO SWITCHING

RELATED APPLICATIONS

This application claims the benefit of U.S. Provisional Application No. 60/892,964 filed Mar. 5, 2007.

TECHNICAL FIELD

This disclosure generally relates to conferencing systems.

BACKGROUND

In traditional multipoint videoconferencing there is one video stream and one audio stream that is sent from each terminal to a conference bridge. Typically, the conference bridge decodes the audio stream from each terminal to determine the voice activity. The terminals with the highest voice activity, or loudest talkers, are marked as active participants. This may be facilitated by encoding voice activity measurements into packets in the audio streams. Depending on the number of video segments that may be displayed at a remote conference site, a number of video streams associated with the active participants may be decoded and re-encoded for display at one or more remote sites. Alternatively, the video segments may be simply re-routed to the conference sites without re-encoding.

In certain conference systems, the most active audio streams may be mixed for distribution to remote conference sites. More advanced conference systems may perform multiple mixes to prevent an echo effect in local sites where there is an active talker or activity. Thus, each conference site having an active talker may receive a unique mixed audio stream that includes the voices of only the active talkers located at a remote conference site or sites.

Given the myriad of possible audio streams that may be generated in a single multipoint conference, encoding and decoding these streams may be a computationally demanding task. Accordingly, some multipoint conferencing systems may tag packets, or frames, of audio data with an activity metric so that it is easy for the conference bridge to quickly determine which audio streams are active without having to actually decode the audio. Other multipoint conferencing systems may analyze key parts of the packet payload to determine voice activity without the computationally burdensome process of decoding and measuring the activity of the packet.

DESCRIPTION OF EXAMPLE EMBODIMENTS

Overview

In an embodiment, a method includes receiving a plurality of audio signals, wherein the audio signals each include a plurality of packets containing voice data associated with conference participants. One or more of the audio signals is associated with a video signal and at least one of the audio signals is associated with a voice-only conference participant. The method further includes determining an activity metric for each of the plurality of audio signals, wherein the activity metric indicates a confidence value that the audio signal is associated with a conference participant that is currently speaking. The method also includes encoding, for each of the plurality of audio signals, one or more packets of the plurality of packets with the activity metric and sending the plurality of audio signals encoded with an activity metric to a conference bridge.

In another embodiment, a method includes receiving a plurality of audio signals encoded with an activity metric from one or more of a plurality of conference sites. The activity metric indicates a confidence value that the audio signal is associated with a conference participant that is currently speaking. Additionally, one or more of the audio signals is associated with a video signal and at least one of the audio signals is associated with a voice-only conference participant. The method further includes determining the most active signals based on their respective activity metrics and sending a plurality of the most active audio signals to one or more of the plurality of conference sites.

Description

Figure 1A:
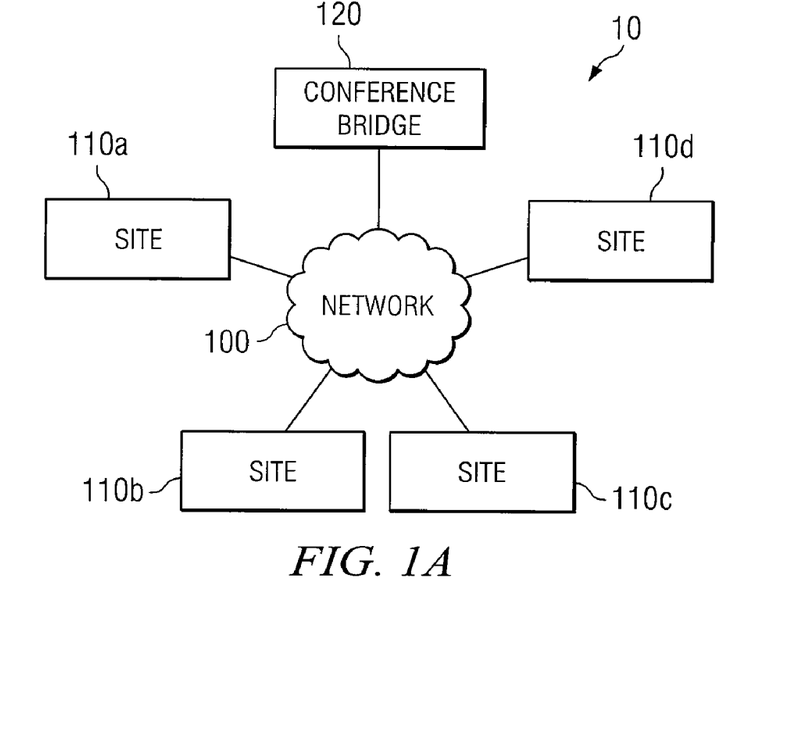
FIG. 1A illustrates an example communication system for conducting a multipoint conference.

FIG. 1A is an example communication system 10 for conducting a multipoint conference between participants at various locations. The illustrated embodiment includes a communication network 100 that may support conferencing between remotely located sites 110a-110d. Also illustrated is a conference bridge 120 which facilitates the communication of audio and/or video signals between sites 110 participating in a conference. An example embodiment of a site 110 is provided in FIG. 1B. As used herein, a "conference" may include any communication session between a plurality of users transmitted using any audio and/or video means, including signals, data or messages transmitted through voice and/or video devices, text chat, and instant messaging.

Communication network 100 represents communication equipment, including hardware and any appropriate controlling logic for interconnecting elements coupled to communication network 100. In general, communication network 100 may be any network capable of transmitting audio and/or video telecommunication signals, data, and/or messages. Accordingly, communication network 100 may include all or a portion of, a radio access network (RAN); a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate the described communication capabilities, communication network 100 may include routers, hubs, switches, gateways, call controllers, and or any other suitable components in any suitable form or arrangements. Additionally, communication network 100 may represent any hardware and/or software configured to communicate information in the form of packets, cells, frames, segments or other portions of data. Although communication network 100 is illustrated as a single network, communication network 100 may include any number or configuration of networks. Moreover, communication system 10 may include any number or configuration of communication networks 100.

Conference bridge 120 serves as an intermediary during a multipoint conference. In operation, conference bridge 120 acts as a conduit that interconnects media signals between sites 110. Specifically, conference bridge 120 may collect audio and/or video signals generated at a site 110 and distribute the signals to other sites 110 participating in a multipoint conference. Conference bridge 120 may be configured to support any number of sites communicating on any number of conferences. Additionally, conference bridge 120 may be operable to assign remote audio and/or video signals to particular conference devices at a local site 110. To facilitate the described functionality, conference bridge 120 may include any bridging or switching device used in support of multipoint conferencing, including videoconferencing. In various embodiments, conference bridge 120 may include hardware, software and/or embedded logic such as, for example, one or more codecs. In some embodiments, various components and/or functionality of conference bridge 120 may be distributed throughout communication system 10, for example, at sites 110.

Figure 1B:
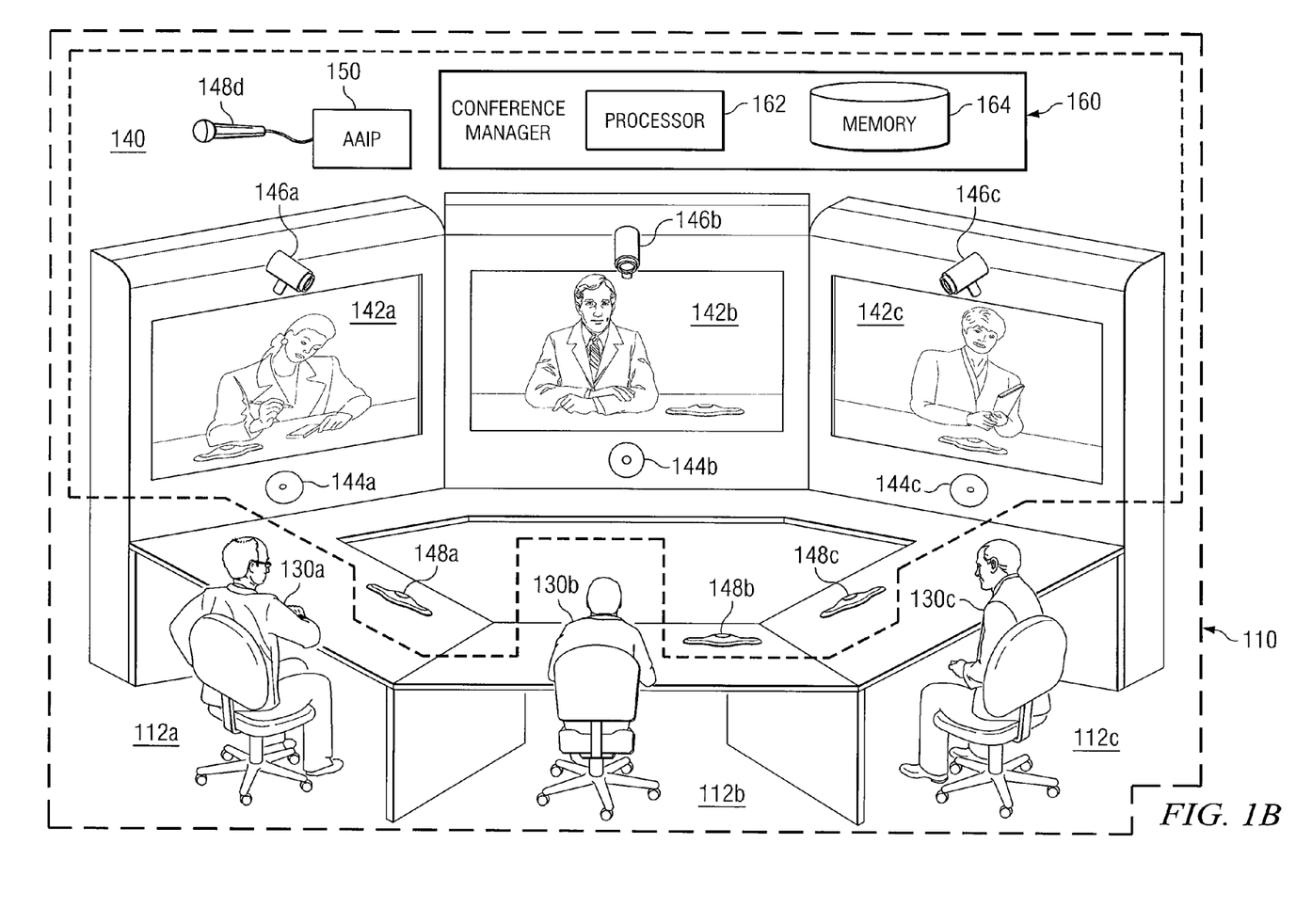
FIG. 1B illustrates an example site for conducting a multipoint conference.

FIG. 1B is a simplified diagram of a site 110. In the illustrated embodiment, site 110 includes conference equipment 140 which facilitates conferencing between local users 130 and participants at a remote site 110. Although the site 110 illustrated in FIG. 1B has a particular number and configuration of various components, a site 110 may include any number, combination, or arrangement of such devices.

Users 130*a*-130*c* represent one or more individuals or groups of individuals who may be present for a conference. Users 130 may participate in a videoconference using any suitable device and/or component, such as audio Internet Protocol (IP) phones, video phone appliances, personal computer (PC) based video phones, and streaming clients. During a conference, users 130 may engage in the session as speakers or participate as non-speakers.

Conference equipment 140 may include any suitable elements for establishing and supporting a videoconference. In the illustrated embodiment, conference equipment 140 includes monitors 142, loudspeakers 144, cameras 146, microphones 148, auxiliary audio input port (AAIP) 150, and conference manager 160. While not explicitly shown, conference equipment 140 may also include one or more network interfaces, memories, processors, codecs, or any other suitable hardware or software for conferencing between remote locations. In operation, conference equipment 140 may establish a videoconference session using any suitable technology and/or protocol, such as Session Initiation Protocol (SIP) or International Telecommunication Union (ITU) Recommendation H.323. Additionally, conference equipment 140 may support and be interoperable with other video systems supporting other standards, such as H.261, H.263, and/or H.264.

Monitors 142*a*-142*c* may include any suitable hardware and/or software to facilitate receiving a video signal and displaying the image associated with one or more remote conference participants to users 130 at a local site 110. Examples of monitors 142 may include a notebook PC, a wall mounted monitor, a floor mounted monitor, or a free standing monitor. Monitors 142 may be operable to display the image from a video signal using any suitable technology that provides a realistic image, such as high definition.

Loudspeakers 144*a*-144*c* represent electromechanical devices operable to convert an audio signal generated by a microphone 148 at a remote conference site 110 into sound. In particular, loudspeakers 144 may locally broadcast the voice of one or more remote participants speaking during a conference. According to one embodiment, there is one loudspeaker 144 per monitor 142 at a site. In certain embodiments, loudspeakers 144 may be combined with other components of conference equipment 140 such as, for example, monitors 142. Additionally, a site 110 may include more or fewer loudspeakers 144.

Cameras 146*a*-146*c* may include any suitable hardware and/or software for capturing and generating an image of one or more users 130 and the surrounding area. In operation, each camera 146 may generate a stream of images and transmit the stream as a video signal. The video signal generated by a camera 146 may be compressed and received at a remote site 110. The remote site 110 may decompress the video signal for display over a monitor 142. While the illustrated embodiment of site 110 includes three cameras 142 generating three video signals, particular embodiments may include more or fewer cameras 142 generating any number of video signals.

Microphones 148*a*-148*d* represent any acoustic to electric transducers or sensors operable to convert sound into an electrical signal. In operation, each microphone 148 may capture the voice of one or more local users 130 at a local site 110 and convert it to an audio signal for transmission to a remote site 110. Once received at a remote site 110, the audio signal may be broadcast by a loudspeaker 144. While the illustrated embodiment indicates that there is a microphone 146 for each user 130, a particular site 110 may have more or less microphones than users 130. Additionally, in certain embodiments microphones 148 may be combined with any other component of conference equipment 140 such as, for example, cameras 146.

Auxiliary audio input port (AAIP) 150 may be an input/output channel operable to receive, generate, and/or transmit an auxiliary audio signal. In particular, AAIP 150 may serve as an input port for an auxiliary microphone 148*d* or other audio device. A typical application of auxiliary microphone 148*d* may be for a handheld or lavelier (lapel) wireless microphone. AAIP 150 may also represent an input for a local audio source such as an audio-visual presentation or the audio component from a DVD player. In an embodiment, AAIP 150 may serve as a dial-in audio port that enables a voice-only conference participant to remotely call into a conference. Accordingly, a voice-only dial-in participant may participate in a conference session by calling into a site 110 directly as opposed to a bridge or other conference hub. Although AAIP 150 is illustrated as a stand-alone device, AAIP 150 may be integrated with any component of conference equipment 140 including, for example, a conference manager 160.

Conference manager 160 may communicate information and signals between communication network 100 and a site 110. Generally, conference managers 160 may represent any suitable hardware and/or software for managing a conference. Particular embodiments of a conference manager 160 may include one or more processors, memories, interfaces, or codecs. In operation, conference managers 160 may send and receive signals containing conference media between sites 110 through a conference bridge 120. With respect to site 110, conference manager 160 may transmit four audio signals and three video signals to conference bridge 120. Similarly, conference manager 160 may also receive at least four audio signals and three video signals from conference bridge 120. The four transmitted audio signals may be generated by three microphones 146*a*-146*c* and a mix of any of: a) the AAIP 150 microphone, b) auxiliary audio input from an play-out device like a DVD player, and c: and an audio-only dial-in signal; while the three video signals may be generated by cameras 144*a*-144*c*.

In a particular embodiment, conference manager 160 may encode the audio signals with a high quality codec at 48 kHz using a Franhofer low-delay audio codec (AAC-LD). The audio signal generated by AAIP 150 may be re-sampled from an 8 kHz sample rate and converted to a 48 kHz sample rate.

In this manner, multiple auxiliary audio inputs may be mixed to produce a single auxiliary audio stream.

As represented in FIG. 1B, conference manager 160 includes a processor 162 and memory 164. Processor 162 may execute commands and instructions associated with the services provided by conference manger 160. Examples of processor 162 include a combination of application-specific integrated circuits (ASICs), field-programmable gate arrays (FGPAs), digital signal processors (DSPs), and any other suitable specific or general purpose processors. Memory 164 may store processor instructions and/or any other appropriate information used by conference manager 160. Such information may include signal processing instructions, encoding algorithms, signal mixing instructions, and any compression/decompression protocols.

To facilitate conferencing among multiple users 130, site 110 may be divided into multiple zones 112. In the illustrated embodiment, site 110 is divided into a left zone 112a, center zone 112b, and right zone 112c. For purposes of this specification, the spatial convention for left and right is defined from the perspective of a user 130 facing a monitor 142. As illustrated, each zone contains various conference equipment components which service one or more users 130 positioned in the zone. In particular, each zone 112 includes a monitor 142, loudspeaker 144, camera 146, and a microphone 148. The conference equipment servicing each zone may be associated with a particular channel which is generated at a local site 110 and received at a remote site 110 for broadcast. As will be discussed in greater detail, a channel corresponds to an audio and/or video signal to be broadcast and/or displayed in a particular zone 112 of a site 110. With respect to audio signals generated by AAIP 150, an auxiliary channel may correspond to audio signals to be broadcast by an auxiliary loudspeaker and/or mixed and broadcast over various loudspeakers 144 in particular zones. Accordingly, an auxiliary channel may be broadcast by a loudspeaker 144 in a single zone 112, a combination of zones 112, or a separate auxiliary device which may not be associated with a zone.

As illustrated in FIG. 1B, cameras 146a-146c and microphones 148a-148c are associated with zones 112a-112c, respectively. Accordingly, a given microphone 148 may generate an audio signal containing the voice of one or more users 130 positioned in a respective zone 112 and a camera 146 may generate a video signal containing an image of the user(s) 130 in the respective zone 112. More particularly, the audio signal generated by each of microphones 148a-148c may correspond to a video signal generated by a camera 146a-146c, respectively. Thus, each channel transmitted by a site 110 may contain an audio signal and a video signal associated with the same user(s) 130 positioned in a particular zone 112.

Similar to cameras 146 and microphones 148, monitors 142a-142c and loudspeakers 144a-144c are associated with zones 112a-112c, respectively. Accordingly, a monitor 142 may display an image of a remote user 130 positioned in a particular zone 112, while a loudspeaker 144 simultaneously broadcasts the voice of the same remote user 130. During a conference, monitors 142 and loudspeakers 144 may display and broadcast the image and voice, respectively, of a remote participant such that a local user 130 views and hears the remote participant as though the remote participant is positioned directly across a conference table. To provide the described spatial consistency, the zone where a respective channel is broadcast at a local site may be opposite the zone that a remote user associated with the channel is positioned. To clarify, as mentioned, a channel corresponds to an audio and/or video signal to be broadcast and/or displayed in a particular zone 112. Thus, a left channel corresponds to audio and/or video signals to be broadcast over a loudspeaker and/or monitor in a local left zone 112a. When positioned in a conference site 110, the spatial left for a local user 130 is the spatial right for a remote user 130 and vice versa. Accordingly, in a multipoint or point-to-point conference between sites 110, the audio and video signals associated with the left channel may be generated by conference equipment positioned in a remote right zone. Therefore, a video signal generated by camera 148c in a local right zone 112c may be displayed by a monitor 142a positioned in a remote left zone 112a. This opposition may ensure spatial consistency between generated and broadcast audio and video signals. Thus, a user 130 positioned in left zone 112a may view a remote user over monitor 142a as though the remote user 130 is positioned directly across a conference table.

To maintain spatial consistency, transmitted audio and video packets may be encoded with a spatial identifier. The spatial identifier may indicate the source zone 112 and/or a destination zone 112. Accordingly, the spatial identifier may facilitate routing and distribution of audio and video signals. In certain embodiments, the spatial identifier may be a part of a packet header, thus allowing for packets to be routed without having to decode the payload. In certain embodiments, the encoding may be performed by, for example, microphones 148, cameras 146, AAIP 150, and/or conference manager 160.

During a conference, AAIP 150, and/or conference manager 160 may also be operable to encode audio packets associated with an audio signal with an activity metric. An activity metric may be a confidence value or acoustic measurement which may be used to determine an active channel. An active channel is an audio and/or video signal which corresponds to a conference participant currently talking (i.e. an active talker). An activity metric may be measured and/or calculated based on the relative loudness (i.e. decibel level) of a particular voice. In certain modes of operation, the activity metric for a particular signal may be dynamic. Thus, once a user 130 stops speaking or another user 130 begins to speak, the activity metric encoded in the respective audio packets for each signal may be adjusted accordingly. As with the encoding of the spatial identifier, the activity metric may be included in a portion of a packet header. Thus, decoding of audio data and/or decompression of an audio signal may not be required to identify an encoded activity metric.

In certain embodiments, the activity metric may account for spoofing. As used herein, spoofing refers to any error in an activity metric due in part to mistaking sound activity from an adjacent zone 112. Generally there are at least three activities that cause spoofing: 1) sound energy produced by an adjacent talker; 2) a difference in sensitivity between microphones; and 3) residual energy due to reverberation at a site. With respect to spoofing created by an adjacent talker, because zones 112 may not be actual physical barriers, a microphone 148 may pick up residual sound waves from a speaker positioned in an adjacent zone 112. A similar result may occur if a given microphone 148 is more sensitive than one or more other microphones 148. As an example, if microphone 148a is slightly more sensitive than microphone 148b, then microphone 148a may be spoofed by a speaker near the border of zones 112a and 112b. Regarding reverberation, a principal concern is sound energy that lingers in a site 110 after a user 130 finishes speaking. For instance, almost instantaneously after an utterance concludes, the sound energy of a microphone 148 near a wall may have a higher sound energy reading than a microphone in the middle of a site as a result of sound waves bouncing off of the wall.

To account for spoofing, the activity metric may be defined in part based on acoustic data collected by multiple microphones 148. In particular, conference manager 160 may receive audio signals from each microphone 148 and a voice-only audio signal from AAIP 150 and determine respective activity metrics. Using measurements from multiple microphones to define respective activity metrics may allow for a more accurate active talker determination when compared to activity metrics determined solely based on a singular measurement from each microphone 148. More particularly, the activity metric may differentiate between sound activity in each zone. As an example, if user 130*a* in zone 112*a* is currently speaking, microphones 148*a*-148*c* may each collect sound waves associated with the voice of the user 130. Because user 130*a* is closest to microphone 148*a*, the decibel level may be highest at microphone 148*a*, lower at microphone 148*b*, and lowest at microphone 148*c*. If each microphone 148*a*-148*c* were to individually assign an activity metric to its respective audio signal, then uncertainty may exist as to whether the low decibel level at microphone 148*c* is due to user 130*c* speaking with a soft voice, because microphone 148*a* is more sensitive, or whether microphone 148*c* is collecting residual sound waves from reverberation or a speaker outside of its respective zone. Thus, to account for spoofing, one or more algorithms may be employed to determine the activity metric for each of the microphones 148. Factors which the algorithm(s) might weigh include microphone sensitivity, measurement/reading delay among microphones, static background noise, as well as the respective decibel measurements at each of the microphones 148. While specific factors are provided, any factors which may facilitate an accurate determination of one or more active talkers may be used.

Returning now to FIG. 1A, during a conference, conference bridge 120 may distribute audio and video signals to sites 110*a*-110*d* based in part on the activity metric encoded in various audio streams. In particular, conference bridge 120 may determine the most active channels (i.e. audio and/or video signals corresponding to a conference participant that is speaking) using the activity metric tagged to packets in the various audio signals received from remote sites 110. Accordingly, conference bridge 120 need not decode audio and/or video data to determine an active channel. As previously mentioned, a channel may correspond to an audio and/or video signal to be broadcast in a particular zone 112 of a site 110. Once the most active channels are determined, conference bridge 120 may route the respective audio and video signals associated with the channels to one or more remote sites 110. Limiting the routed channels to the most active channels may reduce the bandwidth needed to service a remote site 110. Additionally, avoiding decoding of each audio channel may reduce overall audio latency.

In the embodiment illustrated in FIGS. 1A and 1B, conference bridge 120 may generally distribute four channels of audio to each site 110. The channels may be of various combinations and may originate from various sites 110. For example, two channels might be auxiliary channels from an AAIP 150, one channel might be from a microphone 148*b* in a center zone 112*b*, and another channel might be from a right microphone 148*c*. In certain situations each channel may originate from a different site 110. In a particular situation, the most active channels may all be left channels and originate from a right zone 112*c* at each site 110. In this case, each of the left audio signals may be mixed and broadcast over a left loudspeaker 144*a*. Alternatively, the left audio signal associated with the video signal selected for display on the left monitor 142*a* may be played exclusively through the left loudspeaker 144*a*, and the other left channel audio signals may be broadcast through an auxiliary speaker (not illustrated). In situations where an auxiliary channel is one of the most active channels, the auxiliary channel audio signal may be mixed with the respective audio signals broadcast through each of loudspeakers 144*a*-144*c*. In certain embodiments, the auxiliary channel may be broadcast through a separate auxiliary loudspeaker.

As mentioned, audio signals may be mixed and then broadcast from a single loudspeaker 144. In certain embodiments the mixing of signals may be performed at conference bridge 120 prior to routing. Alternatively, the mixing may be performed by a conference manager 160 at a site 110. In a particular embodiment, conference manager 160 may mix audio signals prior to sending the signals to conference bridge 120. As an example, if multiple voice-only participants are participating in a conference through AAIP 150, then conference manager 160 may mix the multiple auxiliary audio signals and send them over a single auxiliary channel. By contrast, conference manager 160 may also mix audio signals after receiving routed signals from conference bridge 120. In such embodiments, the audio packets associated with various audio signals may be encoded to indicate that mixing should occur. As an example, each of the audio packets may contain a code field to indicate that the audio signal is associated with a particular video signal. Additionally, the code field may also indicate an associated channel. Thus, when a conference manager 160 receives multiple audio signals associated with a particular channel without receiving a respective video signal for each, conference manager 160 may mix the various audio signals. Conference manager 160 may then forward the mixed audio signal to the appropriate loudspeaker(s) 144 for broadcast.

In an embodiment, conference bridge may transmit N+1 audio channels and N video channels to each site 110. The additional audio channel may be used as a transition for active talkers until an active video signal switches. As an example, assume that at a given time during a videoconference between sites 110*a*-110*d* the four most active channels based on activity metrics are two left channels, a center channel, and a right channel. Because a left monitor may only display a video signal from a single left channel, conference bridge 120 may select the video signal associated with the most active of the two active left channels for transmission. However, conference bridge 120 may still transmit the audio signals associated with each of the four most active channels. Accordingly, audio from the less active left channel may be broadcast at various sites, however local users may not view an image of the speaker. Now, if the previously more active left channel suddenly becomes less active than the previously less active channel, then conference bridge 120 may switch to transmitting the video signal associated with the previously less active left channel. Thus, the additional left audio channel may serve as a transition such that local conference participants do not miss remote communications during an active video signal switch.

To further illustrate the capabilities of conference bridge 120, assume that at a given time that four users 130 currently speaking are all positioned in left zone 112*a* of their respective sites 110*a*-110*d*. Thus, all of the active talkers are associated with a left zone 112*a* (and thus a right channel) and only one user 130 may be displayed on a right monitor 142*a* at any given site 110. In a particular embodiment, conference bridge 120 may select the right channel with the highest sustained activity metric and transmit the audio and video signals associated with that channel to each site 110, excluding the source site. Each site 110 that receives the selected right channel audio and video signals may broadcast and display the signals over a right loudspeaker 144c and right monitor 142c, respectively. In certain embodiments, the remaining right channel audio signals may also be routed to each site 110 other than their respective source site. Each of these audio signals may be mixed with the audio signal associated with the most active channel and broadcast over right loudspeaker 142c.

With respect to video, conference bridge 120 may elect to distribute only video signals associated with the most active audio signal for a particular zone 112. In a site 110 with adjacent monitors 142, it may be psychologically disturbing for a right video signal to suddenly jump from the right video display 142a to a center 142b or left video display 142c. Therefore, a policy may be set that only one "right" video channel may be displayed at one time. In addition, avoiding sending all right video channels may reduce signal processing at a site 110 as well as latency and jitter issues. Regarding the left and center channels, conference bridge 120 may continue to route the most active signals to various conference sites 110.

Figure 2:
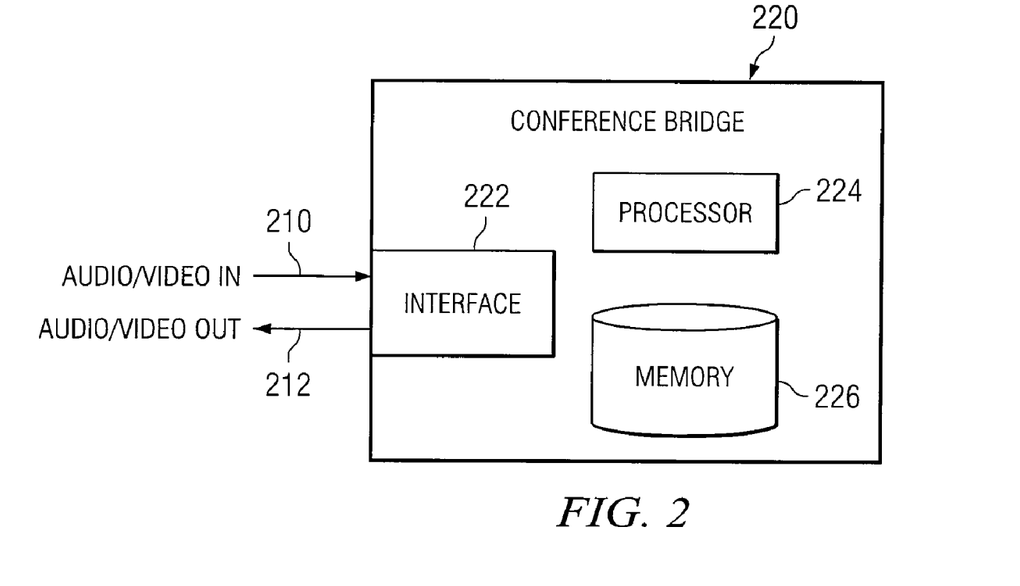
FIG. 2 illustrates an example conference bridge for facilitating a multipoint conference.

FIG. 2 is a simplified block diagram illustrating a conference bridge 220 in accordance with a particular embodiment. Conference bridge 220 may provide all of the functionality associated with conference bridge 120 described with respect to FIG. 1. As represented in FIG. 2, conference bridge 220 may receive an Audio-Video input signal 210 from a conference site and distribute an Audio-Video output signal 212 to one or more remote sites. The functionality associated with conference bridge 220 may be provided by an interface 222, processor 224, and memory 226. While a particular configuration and number of components is illustrated, conference bridge 220 may include any components which may provide the recited functionality.

Interface 222 is capable of communicating information and signals to and receiving information and signals from a communication network such as communication network 100 of FIG. 1. Interface 222 may represent any port or connection, real or virtual, including any suitable hardware and/or software that allows conference bridge 220 to exchange information and signals with other devices over a communication network. Examples of Interface 222 may include an Ethernet driver, T1 or L1 interface, Integrated Services Digital Network (ISDN) interface, wireless network interface such as Wi-Fi, network card and/or firewall. As illustrated, interface 222 is operable to receive one or more Audio-Video input signals 210 from one or more sites participating in a conference and transmit one or more Audio-Video output signals 212 to one or more other sites participating in the conference. It should be noted that one or more Audio-Video input signals 210 may be substantially similar to Audio-Video output signals 212.

Processor 224 controls the operation and administration of conference bridge 220 by processing information and signals received from various conference equipment. Processor 224 may include any suitable hardware, software, or both that operate to control and process signals. Examples of processor 224 include, but are not limited to, application-specific integrated circuits (ASICs), field-programmable gate arrays (FGPAs), digital signal processors (DSPs), and any other suitable specific or general purpose processors. Additionally, processor 224 may execute code to perform any of the described operations.

Memory 226 may store data, processor instructions, and/or any other information used by conference bridge 220. In certain embodiments, memory 226 may store site identifiers, routing instructions, and/or signal processing algorithms. Memory 226 may also store software for execution by processor 224 to control operation and perform the described functionality of conference bridge 220. Memory 226 may include any form of volatile or non-volatile memory including, without limitation, magnetic media, optical media, random access memory (RAM), read-only memory (ROM), removable media, or any other suitable local or remote memory component.

Figure 3:
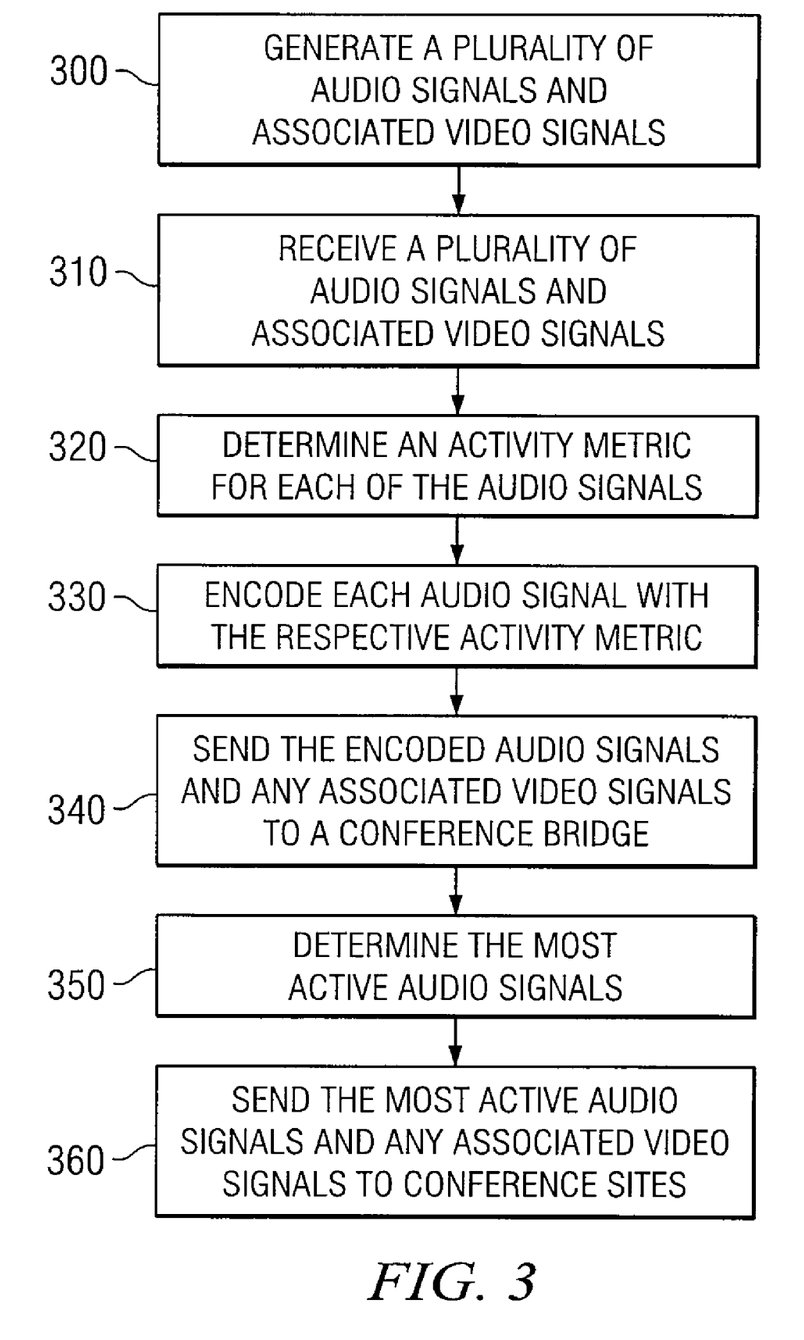
FIG. 3 is a flowchart illustrating an example method for video switching during a multipoint conference.

FIG. 3 is a flow chart illustrating a method for video switching during a multipoint conference. The described process begins at step 300 where a plurality of audio signals and any associated video signals are generated. The audio signals may be generated by microphones 148 and the associated video signals may be generated by one or more cameras 146. Additionally, at least one of the audio signals may be associated with a voice-only participant and not have an associated video signal. As discussed, a voice-only participant may be a remote user (i.e. not at a site 110) that dials-in and connects to the conference through the conference manager 160.

The process continues at step 310 wherein the plurality of audio signals are received by, for example, conference manager 160. In response to receiving the audio signals, conference manager 160 may determine an activity metric for each of the audio signals at step 320. The activity metric may correspond to a confidence value that a particular microphone is receiving sound waves associated with an active talker. In certain embodiments, the activity metric may be calculated using an algorithm which compares acoustic data associated with multiple microphones and/or AAIP 150.

After determining an activity metric, one or more packets associated with each audio signal may be encoded with the respective activity metric for the signal at step 330. Additionally, the audio packets may also be encoded with a spatial indicator that provides the channel associated with the microphone that generated the audio signal. In particular, the spatial indicator may provide that the audio signal is a left, center, or right channel. If the audio signal was generated by AAIP 150, then the spatial indicator may provide that the audio signal is associated with an auxiliary channel. As discussed, a channel may correspond to one or more zones 112 at a site 110 where an audio and/or video signal is to be broadcast. With respect to an auxiliary channel, the audio signal may be broadcast in any single zone 112, a combination of zones 112, and/or a separate auxiliary device.

At step 340, the encoded audio signals and any associated video signals may be sent to a conference bridge 120. In response to receiving audio signals from various sites participating in a conference, conference bridge 120 may determine the most active audio signals at step 350. This determination may be made on a channel by channel basis according to the activity metric encoded in various audio signals. Thus, conference bridge 120 may determine the most active left, center, right, and auxiliary channels, respectively. Alternatively, conference bridge 120 may determine the most active audio signals overall, regardless of channel.

In response to determining the most active audio signals, at step 360, conference bridge 120 may send the most active audio signals and any associated video signals to various conference sites 110. In particular, conference bridge 120 may send the selected audio and video signals to each site 110 participating in a conference other than the respective origination site 110 of each signal.

Modifications, additions, or omissions may be made to the method depicted in FIG. 3. In certain embodiments, the method may include more, fewer, or other steps. Additionally, certain steps may be performed by other components and devices. For example, microphone 148 or AAIP 150 may also be operable to perform step 320 and/or step 330. Further, the steps described in the methods illustrated in FIG. 2 may be performed in any suitable order without departing from the scope of the disclosure.

In an embodiment, the determination of an activity metric for one or more audio signals may be performed using the following algorithm provided in ANSI C code:

```
#include "tsbu_c67_audio.h"
#include "Qdfunctions.h"
#include "vadmetrics.h"
#include "scutils.h"
#include "vutils.h"
#include "fastrts67x.h"
#include <math.h>
/* the following matrix is used to find any channels which are no
 * doubt active beyond the maximum power level microphone. That is,
 * even assuming worst case coupling, the power is still to the point
 * that any positive result must be an indicator of true activity.
 * This is the coupling of the talker at the corresponding position
 * to the other microphones. Note that the Auxiliary wireless microphone
 * is not symetric. The wireless microphone is very close to the
 * intended talker. Hence the other talkers will not couple very strongly
 * to the wireless microphone, but the wireless talker might couple
 * into the other microphones.
 * So the coupling factors below represent of the degree of coupling
 * of energy into the other microphones that were not intended.
 * This factor is a ratio of the unintended microphone over the
 * intended microphone.
 */
#define ADJACENT_FACTOR_LFP        0.5f      // 3 dB less coupling
#define AUX_TALKER_2_MIC_LFP       0.25f     // 6 dB less coupling to all other mics
#define MIC_TALKER_2_AUX_LFP       0.125f    // 9 dB less coupling
#define FAR_MIC_FACTOR_LFP         0.1f      // 10 dB less coupling
#define ADJACENT_FACTOR_LFN        0.125f    // 9 dB nominal less coupling
#define AUX_TALKER_2_MIC_LFN       0.06f     // 12 dB less coupling to all other mics
#define MIC_TALKER_2_AUX_LFN       0.015f    // 18 dB less coupling
#define FAR_MIC_FACTOR_LFN         0.03f     // 15 dB less coupling
float CouplingMatrixLowFalsePositives[4] [4] = {
1.0f,
-ADJACENT_FACTOR_LFP,
-AUX_TALKER_2_MIC_LFP,
-FAR_MIC_FACTOR_LFP,
-ADJACENT_FACTOR_LFP,
1.0f,
-AUX_TALKER_2_MIC_LFP,
-ADJACENT_FACTOR_LFP,
-MIC_TALKER_2_AUX_LFP,
-MIC_TALKER_2_AUX_LFP,
1.0f,
-MIC_TALKER_2_AUX_LFP,
-FAR_MIC_FACTOR_LFP,
-ADJACENT_FACTOR_LFP,
-AUX_TALKER_2_MIC_LFP,
1.0f
};
float CouplingMatrixLowFalseNegatives[4] [4] = {
1.0f,
-ADJACENT_FACTOR_LFN,
-AUX_TALKER_2_MIC_LFN,
-FAR_MIC_FACTOR_LFN,
-ADJACENT_FACTOR_LFN,
1.0f,
-AUX_TALKER_2_MIC_LFN,
-ADJACENT_FACTOR_LFN,
-MIC_TALKER_2_AUX_LFN,
-MIC_TALKER_2_AUX_LFN,
1.0f,
-MIC_TALKER_2_AUX_LFN,
-FAR_MIC_FACTOR_LFN,
-ADJACENT_FACTOR_LFN,
-AUX_TALKER_2_MIC_LFN,
1.0f
};
/* Track down factor, roughly 6 dB per 50 ms, operates on power */
#define BETA_VAD_TRACK 0.75
#define ALPHA_VAD_TRACK 0.25
#define VAD_THRESHOLD_LFP     25000.0f;    // 10^5 * .25 50 dB - 6 dB scaling
#define VAD_THRESHOLD_LFN      6250.0f;    // 10^5 * .0625 50 dB - 12 dB scaling
#define BETA_INHIB_LFP 0.5f                // inhibit detection sustained
#define BETA_INHIB_LFN 0.5f                //
#define VAD_INHIB_FACTOR_LFP 0.5f   // .25  .125 .025
#define VAD_INHIB_FACTOR_LFN 0.25f  // .125 .062 .031
```

```
#define REVERB_ADJUST_MAIN_MICS  1.0f
#define REVERB_ADJUST_AUX_MICS   0.25f    // 6 dB less than main mics
/* If reverberation causes false activity
 * in a microphone then increase these numbers.
 * The rough approximation is based on a critical distance of 1 meter.
 * The max power into a microphone is generated at .5 meters from it.
 * The directivity of the microphones is about 2, So the long term
 * direct to reverberant ratio is about .25 (.5 meters / 1.0 meters / Q )
 * This has to be computed with the reverb alpha to get the long term.
 * for alpha=.24 and REVERB_FACTOR=.2 then the long term ration of direct
 * to reverberant is about 1-to-1. With REVERB_FACTOR=.1 then it would be
 * about 2-to-1. 4-to-1 is expected considering Q=2 and the ratio of crit
 * distance to likely distance to the microphone. I am setting the REVERB
 * FACTORs high so that we don't get spoofed with for low false negs or low
 * false positives.
 */
#define REVERB_FACTOR_LFP    0.075f
#define REVERB_FACTOR_LFN    0.15f
/* typical office or conference room has reverb60 time of 500-600 ms
 * or about 60 dB per 500 ms --> 12 dB per 100 ms --> 1.2 dB per 10 ms
 * or drop energy 24% every 10 ms or .76 of previous every 10 ms
 * so alpha = .24 for typical room.
 * For highly reverberant room 1000 ms then use alpha = .13 or .6 dB drop
 * every 10 ms.
 */
#define ALPHA_REVERB_LFN    0.24f   // 500 ms T60
#define ALPHA_REVERB_LFP    0.13f   // 1.0 sec T60
void InitVadMetrics(
        VadMetrics_t *op,
        int    detectionMode )    // 0-low false negatives; 1-low false positives
{
  if( detectionMode == 0 )     // Low False Negatives
  {
      op->CMPtr           = (float *)CouplingMatrixLowFalseNegatives;
      op->AlphaReverb     = ALPHA_REVERB_LFN;
      op->InhibitionFactor = VAD_INHIB_FACTOR_LFN;
      op->InhibBeta       = BETA_INHIB_LFN;
      op->VadThreshold    = VAD_THRESHOLD_LFN;
      op->ReverbFactor    = REVERB_FACTOR_LFN;
  }
  else           // Low False Positives
  {
      op->CMPtr           = (float *)CouplingMatrixLowFalsePositives;
      op->AlphaReverb     = ALPHA_REVERB_LFP;
      op->InhibitionFactor = VAD_INHIB_FACTOR_LFP;
      op->InhibBeta       = BETA_INHIB_LFP;
      op->VadThreshold    = VAD_THRESHOLD_LFP;
      op->ReverbFactor    = REVERB_FACTOR_LFP;
  }
  VZero( &op->VadTrackPowers[0], NUM_SIN_CHANNELS );
  op->ReverbPower = 0.0f;
  op->InhibPower  = 0.0f;
}
void ComputeVadMetrics(
        VadMetrics_t *op,       // contains vadTrackPowers and other stuff
        float *nearTrkPowers,   // input -- NearTrk powers derived elsewhere
        float *noiseFloors,     // input
        float *vadMetric )      // output
{
  int i;
  float powerMax;
  int indexMax;
  float vadPowerModified;
  float reverbAdjust;
  /* Find the maximum power of the microphones.
   * This microphone will be declared to be active for sure and its power
   * is presumed to be accurate for that station.
   * Once this microphone is determined then look for other microphones
   * that must be active because they have substantial */
  indexMax = VFindMax( nearTrkPowers, NUM_SIN_CHANNELS );
  powerMax = *(nearTrkPowers+indexMax);
  op->VadTrackPowers[indexMax] = powerMax;
  /* Now survey the remaining microphones to see which ones must
   * have their own energy. Unlikely to be any adjacent microphone.
   * This requires multiplying each microphone input power by a factor
   * that anticipates the maximum expected coupling (transfer function gain)
   * into the other microphones and subtracting this result form the power of
   * the microphone for that station. See the CouplingMatrix above for
   * the worst-case coefficients.
   */
```

```
/* Channel assignments reminder
 *    Left    - 0
 *    Center  - 1
 *    Right   - 2
 *    Aux     - 3
 */
for( i=0; i<NUM_SIN_CHANNELS; i++ )
{
  /* do initial lateral inhibition based on direct paths */
  vadPowerModified = VDotProduct( nearTrkPowers,
                                  op->CMPtr + i*NUM_SIN_CHANNELS,
                                  NUM_SIN_CHANNELS );
  if( i != 2)
     reverbAdjust = REVERB_ADJUST_MAIN_MICS;
  else
     reverbAdjust = REVERB_ADJUST_AUX_MICS;
  /* subtract room reverberation power estimate. Reverb takes some time
   * to build up. */
  vadPowerModified -= (reverbAdjust * op->ReverbPower);
  /* subtract inhibition power -- inhibits false detection of microphones
   * that are late to the party, but which might have higher sensitivity.
   * Unlike reverb the Inhib power is like lateral inhibition, but
   * penalizes late arrivers.
   */
  vadPowerModified -= (op->InhibitionFactor * op->InhibPower );
  /* leak the power of the current state,
   * but if the certain power is greater than the current
   * state, then accept the new value.
   */
  op->VadTrackPowers[i] *= BETA_VAD_TRACK;      // leak down
  if( vadPowerModified > op->VadTrackPowers[i] )
  {
     op->VadTrackPowers[i] = vadPowerModified;
  }
}
/* create Inhibition Power and apply equally to all microphones
 * InhibPower tracks up and floats down */
op->InhibPower *= op->InhibBeta;
if( op->InhibPower < powerMax )
    op->InhibPower = powerMax;
/* presume the reverb energy to each microphone is about equal */
LeakyAve( (powerMax*op->ReverbFactor), &op->ReverbPower, op->AlphaReverb );
for( i=0; i<NUM_SIN_CHANNELS; i++ )
{
   vadMetric[i] = MapLevelToConfidence(
                          (op->VadTrackPowers[i] - noiseFloors[i]),
                          op->VadThreshold );
}
}
/* Compute activity confidence metric. */
float MapLevelToConfidence( float level, float thresh )
{
  float str;
  float confidence;
  str = level / thresh;
  if( str < 1.0001f )                           // below min thresh
     confidence = 0.0f;
  else if( str < 100.0f )                       // <20 dB above min thresh
//      confidence = 0.45f * log10sp( str );
     confidence = 0.045f * qd10log10( str );
  else if( str < 10000.0f )                     // 20-40 dB above min thresh
//      confidence = 0.9 + (0.045f * log10sp( 0.01f * str ));
     confidence = 0.9 + (0.0045f * qd10log10( 0.01f * str ));
  else
     confidence = 0.99f;
  return confidence;
}
```

While certain embodiments have been described in detail numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. A method comprising:
  receiving a plurality of audio signals at a conference site, wherein:
    the audio signals comprise a plurality of packets containing voice data associated with a plurality of conference participants at the conference site; and
    one or more of the audio signals is associated with a video signal;
  determining an activity metric at the conference site for each of the plurality of audio signals, wherein the activity metric indicates a confidence value that the audio signal is associated with a conference participant that is currently talking;
  encoding, for each of the plurality of audio signals, one or more packets of the plurality of packets with the activity metric; and
  sending the plurality of audio signals encoded with an activity metric to a conference bridge.

2. The method of claim 1, further comprising, for each of the one or more audio signals that is associated with a video signal, sending the video signal to the conference bridge.

3. The method of claim 1, wherein determining an activity metric comprises comparing acoustic measurements associated with each of plurality the audio signals.

4. The method of claim 1, wherein at least one of the audio signals is associated with a voice-only conference participant.

5. The method of claim 4, further comprising:
  determining that multiple audio signals are associated with voice-only conference participants; and
  mixing the multiple audio signals in response to determining that multiple audio signals are associated with voice-only conference participants.

6. The method of claim 4, wherein:
  each of the audio signals associated with a video signal is further associated with a zone of a plurality of zones at a conference site; and
  determining an activity metric comprises determining an activity metric which differentiates between sound activity in each of the plurality of zones.

7. The method of claim 4, wherein:
  each of the audio signals associated with a video signal is further associated with a zone of a plurality of zones at a conference site; and
  the method further comprises encoding each of the audio signals with a spatial identifier, the spatial identifier indicating the zone associated with each of the plurality of audio signals.

8. The method of claim 4, further comprising receiving a plurality of audio signals to be broadcast at a conference site, wherein:
  each of the plurality of audio signals to be broadcast is associated with a channel of a plurality of channels; and
  each of the channels of the plurality of channels is associated with a zone at a conference site.

9. The method of claim 8, further comprising receiving a plurality of video signals to be displayed at a conference site, wherein each of the plurality of video signals is associated with an audio signal of the plurality of audio signals to be broadcast.

10. The method of claim 9, further comprising:
  determining that at least two of the plurality of audio signals to be broadcast are associated with the same channel; and
  mixing the at least two audio signals associated with the same channel in response to determining that at least two of the plurality of audio signals to be broadcast are associated with the same channel.

11. The method of claim 8, further comprising:
  determining that at least one of the plurality of audio signals to be broadcast is associated with an auxiliary channel, wherein the auxiliary channel is associated with a voice-only conference participant; and
  for each channel, mixing the at least one audio signal associated with an auxiliary channel with the audio signals to be broadcast associated with the channel.

12. A system comprising:
  an interface operable to receive a plurality of audio signals at a conference site, wherein:
    the audio signals comprise a plurality of packets containing voice data associated with a plurality of conference participants at the conference site; and
    one or more of the audio signals is associated with a video signal; and
  a processor operable to:
    determine an activity metric at the conference site for each of the plurality of audio signals, wherein the activity metric indicates a confidence value that the audio signal is associated with a conference participant that is currently talking;
    encode, for each of the plurality of audio signals, one or more packets of the plurality of packets with the activity metric; and
    send the plurality of audio signals encoded with an activity metric to a conference bridge.

13. The system of claim 12, wherein for each of the one or more audio signals that is associated with a video signal, the processor is further operable to send the video signal to the conference bridge.

14. The system of claim 12, wherein a processor operable to determine an activity metric comprises a processor operable to compare acoustic measurements associated with each of plurality the audio signals.

15. The system of claim 12, wherein at least one of the audio signals is associated with a voice-only conference participant.

16. The system of claim 15, wherein the processor is further operable to:
  determine that multiple audio signals are associated with voice-only conference participants; and
  mix the multiple audio signals in response to determining that multiple audio signals are associated with voice-only conference participants.

17. The system of claim 15, wherein:
  each of the audio signals associated with a video signal is further associated with a zone of a plurality of zones at a conference site; and
  a processor operable to determine an activity metric comprises a processor operable to determine an activity metric which differentiates between sound activity in each of the plurality of zones.

18. The system of claim 15, wherein:
  each of the audio signals associated with a video signal is further associated with a zone of a plurality of zones at a conference site; and the processor is further operable to encode each of the audio signals with a spatial identifier, the spatial identifier indicating the zone associated with each of the plurality of audio signals.

19. The system of claim 15, wherein the processor is further operable to receive a plurality of audio signals to be broadcast at a conference site, wherein:
 each of the plurality of audio signals to be broadcast is associated with a channel of a plurality of channels; and
 each of the channels of the plurality of channels is associated with a zone at a conference site.

20. The system of claim 19, wherein the processor is further operable to receive a plurality of video signals to be displayed at a conference site, wherein each of the plurality of video signals is associated with an audio signal of the plurality of audio signals to be broadcast.

21. The system of claim 20, wherein the processor is further operable to
 determine that at least two of the plurality of audio signals to be broadcast are associated with the same channel; and
 mix the at least two audio signals associated with the same channel in response to determining that at least two of the plurality of audio signals to be broadcast are associated with the same channel.

22. Logic encoded in one or more tangible media for execution and when executed operable to:
 receive a plurality of audio signals encoded with an activity metric from one or more of a plurality of conference sites, wherein:
  the activity metric indicates a confidence value that the audio signal is associated with a conference participant that is currently talking;
  one or more of the audio signals is associated with a video signal; and
  at least one of the audio signals is associated with a voice-only conference participant;
 determine the most active signals based on their respective activity metrics; and
 send a plurality of the most active audio signals to one or more of the plurality of conference sites.

23. The logic of claim 22, wherein:
 each of the audio signals is associated with a channel of a plurality of channels;
 each of the plurality of channels is associated with a zone at a conference site;
 logic operable to determine the most active signals based on their respective encoded activity metrics comprises logic operable to determine the most active signals for each of the plurality of channels; and
 logic operable to send a plurality of the most active audio signals to one or more of the plurality of conference sites comprises logic operable to send the most active audio signal for each channel of the plurality of channels to one or more of the plurality of conference sites.

24. The logic of claim 23, wherein the logic is further operable to:
 receive a plurality of video signals from one or more of the plurality of conference sites, wherein each of the plurality of video signals is associated with a received audio signal; and
 send the video signals associated with the most active audio signal for each channel of the plurality of channels to one or more of the plurality of conference sites.

25. The logic of claim 23, wherein the logic is further operable to:
 receive a plurality of video signals from one or more of the plurality of conference sites, wherein each of the plurality of video signals is associated with a received audio signal;
 send a plurality of video signals associated with the most active audio signals to one or more of the plurality of conference sites; and
 wherein logic operable to send a plurality of the most active audio signals to one or more of the plurality of conference sites comprises logic operable to send N+1 audio signals to the second conference site, wherein N is the number of video signals sent to the one or more of the plurality of conference sites.

* * * * *